Re.24521

Jan. 31, 1956     F. W. YOUNG     2,732,912
DUST COLLECTOR

Filed Jan. 28, 1953     3 Sheets-Sheet 1

Inventor,
Frank W. Young,
by
    Atty.

Jan. 31, 1956 F. W. YOUNG 2,732,912
DUST COLLECTOR

Filed Jan. 28, 1953 3 Sheets-Sheet 3

INVENTOR
FRANK W. YOUNG
BY
ATTORNEY

United States Patent Office 2,732,912
Patented Jan. 31, 1956

2,732,912
DUST COLLECTOR
Frank W. Young, Medfield, Mass.
Application January 28, 1953, Serial No. 333,639
8 Claims. (Cl. 183—61)

This invention relates to the separation of particles from gases in which they are suspended and is more particularly concerned with a novel rotary filter type of apparatus for continuously separating out and collecting such particles from a gaseous vehicle in a much improved and highly efficient manner.

Heretofore various filtering devices have been proposed for separating out solid particles suspended in a gas. Such devices are useful in the collection of dust, carbon black, soot, etc., and many of the earlier ones have employed the principle of allowing a deposit to collect on the surface of an appropriate filter medium and periodically suspending the filtering operation to remove the collected solids. More recently it has been proposed to contrive the filter medium and discharge mechanism in such a way as to permit periodic discharge of the solids without suspending the operation. For a description of such devices reference may be had to U. S. Patents Nos. 2,551,126 and 2,573,844, of Henry J. Hersey, Jr., in which the collected solids may be blown off the surface of the filter cloth whenever they reach a predetermined thickness or at predetermined time intervals. While the drawbacks of periodic shut-downs and inefficient filtration except during a brief period at the commencement of the operation because of rapid clogging of the filter cloth are to a considerable degree eliminated by the Hersey machines, nevertheless there remain problems not wholly solved, including, for example, intermittent discharge rather than continuous discharge of the solids collected and very severe wear on the filter cloth by the rubbing action of the movable discharge mechanism.

Since the filter medium operates with greatest efficiency when the deposit first starts collecting, it is clear that optimum results should be obtainable by operation with a continuously clean filter surface with continuous discharge of the solids deposited, thereby avoiding build-up of solids on or in the interstices of the medium.

I have found that utilizing the novel apparatus of the present invention this very desirable result may be obtained with corresponding increases in efficiency of collection of dust or other particles suspended in a gas far and above that obtained in the operation of conventional separating devices and without the drawbacks previously mentioned.

It is accordingly an object of the present invention to provide a new and improved apparatus for separating particles from gaseous medium in which they are suspended in a continuous and highly efficient operation.

A further object of the invention is to provide a dust (or other particle) collector employing a filter cloth clean portions of which are continuously presented to the particle laden medium and thereafter the collected particles continuously discharged therefrom prior to reuse.

It is yet another object of the invention to provide, in a novel apparatus of the type described, improved means for discharging the separated solids from the surface of the filter cloth and then removing them from the dust laden atmosphere of the collecting chamber without interfering with the operation of the filter.

A further object of the invention is the provision in a particle collector of the type described of means for continuously discharging the collected solids from the surface of the filter cloth with a minimum wear of the cloth.

Still another object of the invention is the provision of a novel rotary type of filter for separating solids from gases in which the effective filter surface may be enormously increased without in any way impairing the efficiency of discharge of the solids from the filter surface.

With the foregoing objects in mind, in accordance with the invention, I provide a container which forms a collecting chamber having an inlet for the admission of the particle laden gas. A generally cylindrical hollow gas-permeable filter base structure, carrying on its surface a filter cloth, is mounted within this container for rotation about its principal axis. The major portion of the interior of the base structure is connected to a source of suction by a suitable conduit for creating a partial vacuum for drawing the gaseous vehicle into the container and through the filter cloth while leaving a deposit of solids on the outer surface of the cloth. Within the base structure there is mounted a pair of stationary spaced baffles which extend substantially the full length of and engage the inner surface of the base structure for isolating a narrow discharge area of the filter cloth preferably near the bottom of the container from the vacuum. Another conduit supplies gas under slight pressure, and pulsating, to the discharge area between the baffles for continuously loosening and discharging the solids deposited thereon into the chamber where they drop to the bottom. A special valve is arranged in the bottom of the container for releasing the discharged solids without allowing any substantial quantity of the gaseous dust laden vehicle to escape or interfering with the gas flow through the filter cloth. In a preferred form of the invention the supports for the cloth are arranged so that the cloth follows a closed generally zig-zag path about the base structure, thus very substantially increasing the effective filtering area without any increase in the size of the machine. The invention also includes improved and simple mounting means for retaining the filter cloth in the special generally zig-zag pattern while sealing the lateral edges to the heads of the base structure to hold the partial vacuum.

Still further objects, advantages and features of the invention will become apparent from the following detailed description of a preferred embodiment thereof taken in connection with the accompanying drawings, in which like numerals refer to like parts in the several views, and in which—

Fig. 5 is a fragmentary elevation showing the clamping means for holding the margins of the filter cloth in place; and Fig. 6 is a detailed sectional view on line 6—6 of Fig. 5.

For convenience, hereafter the particle separating device of the invention may be referred to as a "dust collector" but it will nevertheless be understood that this term is intended to include a device for the collection of any other particles having the characteristics of solids such as carbon black, smoke, etc. carried by a gaseous vehicle.

Likewise, for convenience, I will refer to the filter medium as a "filter cloth," but nevertheless this term is intended to include any filter medium which may be found suitable for use in my improved dust collector, such as, for example, a medium composed of glass fibers or mineral fibers, a wool felt, etc.

Figure 1:
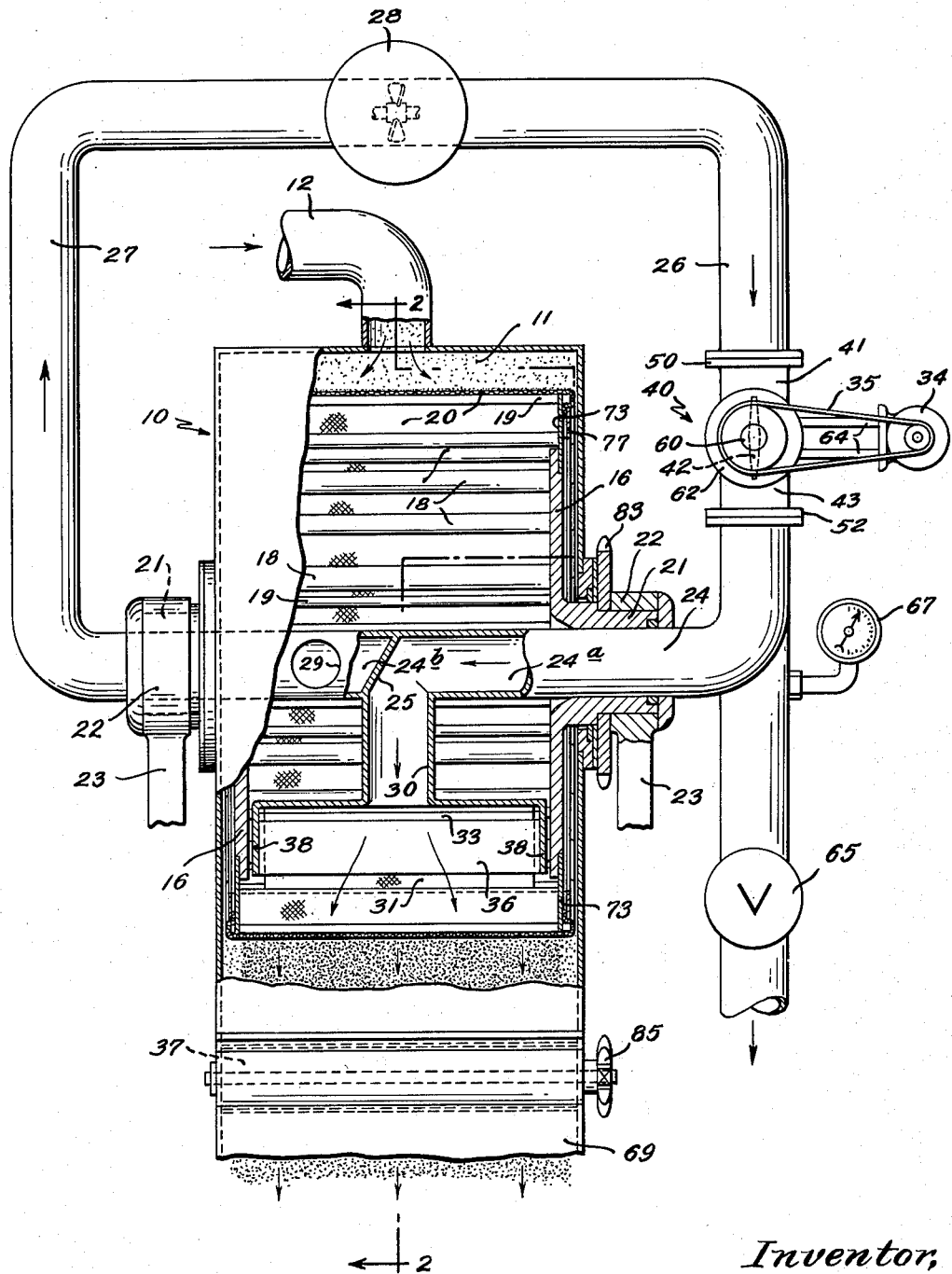
Fig. 1 is a front elevation partly in section, of the novel dust collector of the invention.
Figure 2:
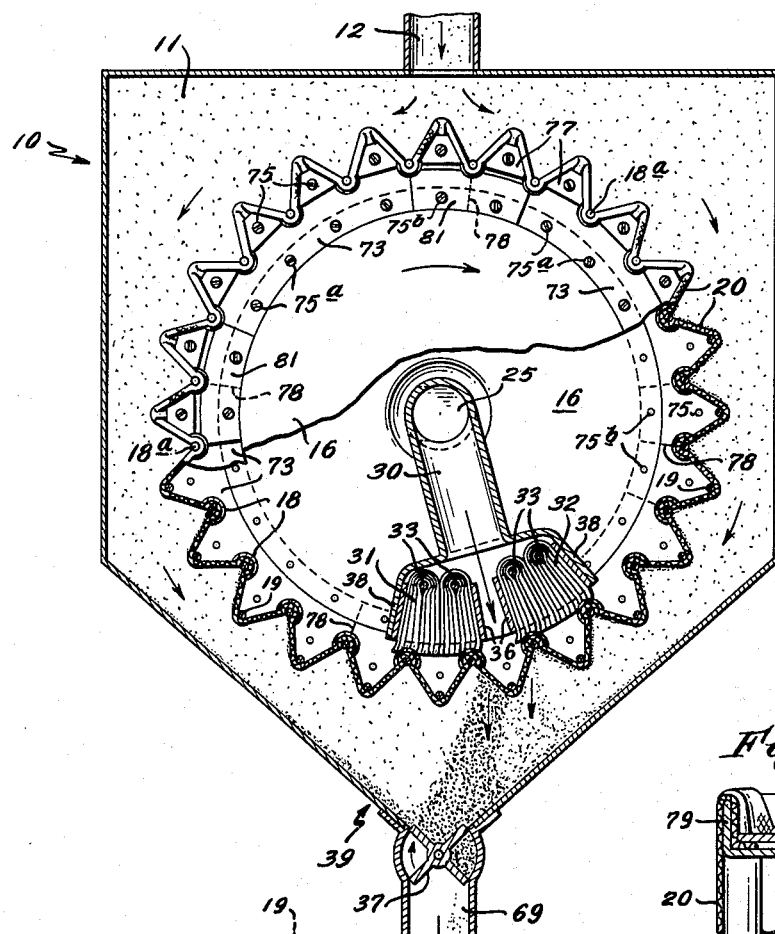
Fig. 2 is a cross-sectional view on line 2—2 of Fig. 1 showing a portion of the same.
Figure 3:
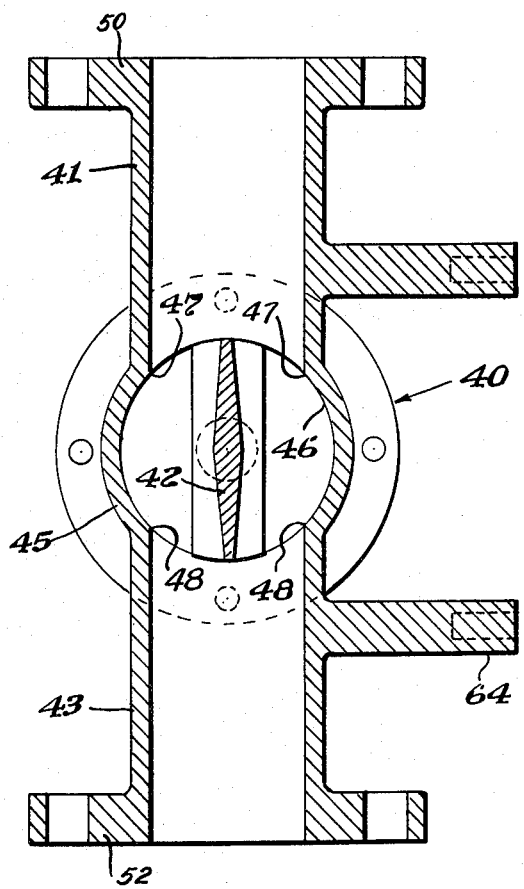
Fig. 3 is a vertical sectional view of the special rotating valve for producing a pulsating air pressure for the discharge of the apparatus of the invention.
Figure 4:
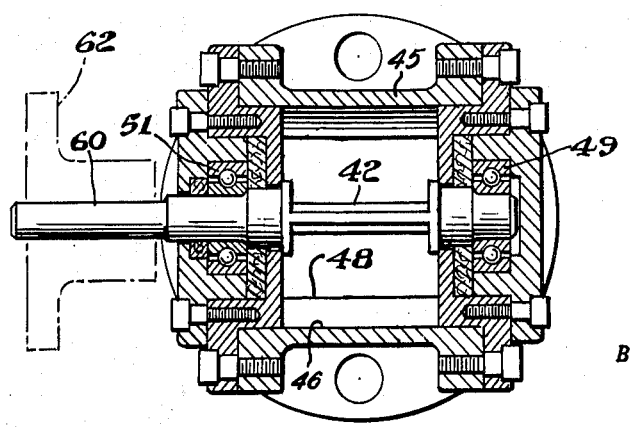
Fig. 4 is a horizontal sectional view of the valve shown in Fig. 3.

Referring first to Figs. 1 and 2, disclosing a presently preferred embodiment of the invention, I provide a tank or container 10 whose interior forms the collecting chamber 11 and into which the gaseous vehicle, laden with dust or other particles, may be admitted through an inlet 12. The side walls of the container 10 converge toward the bottom at an angle, like a trough, so that a device (hereafter described) for discharging the collected solids may be mounted at their juncture. Rotatably mounted within the container is the generally cylindrical filter base structure comprising essentially the circular end rings 16, drum ring sections 73 and inner and outer series of cloth supporting members, the members of the inner series comprising slotted tubes 18 and the members of outer series comprising cylindrical rods 19. The manner in which the surrounding filter cloth 20 is attached to these members will be hereinafter more fully explained.

The end rings 16 are formed into axially outwardly extending trunnions 21 revolving in bearings 22 held by supporting arms 23. The trunnions 21 are hollow and revolve about a stationary conduit 24 which is divided by a partition 25 into two distinct sections 24$^a$ and 24$^b$ one of which emerges through one trunnion and one through the other. Extensions of these two sections, designated by the numerals 26 and 27 respectively, rejoin at a blower 28, which exhausts air from the major portion of the interior of the rotatable filter structure through an opening 29 in the section 24$^b$. The other side of the blower 28 is connected by conduit 26 to the conduit 24 through a special rotating intermittent valve 40 driven by a motor 34 by means of a belt 35, the motor being mounted on the side of the valve 40 by suitable supporting arms 64.

As seen in Figs. 1 and 2, the section 24$^a$ of the pipe 24 has connected to it adjacent the partition 25 a right-angled extension 30 which connects it to a baffle assembly for isolating a narrow portion of the filter cloth from the vacuum and causing discharge of the solids which have collected on its surface. The baffle assembly comprises a pair of spaced flexible baffles 31 and 32 which may be formed of a multiplicity of plies of a suitable fabric, such as canvas, and which extend substantially from one end to the other of the interior of the filter structure. The edges of the baffles yieldingly engage the inner surfaces of the slotted tubes 18 and, preferably, a sufficient number of plies are provided so that each baffle extends in a circumferential direction a somewhat greater distance than the interval between adjacent slotted tubes 18.

The baffles 31 and 32 are identical, and as best seen in Fig. 2, each consists of two sets of plies of flexible material, canvas for example, bent about a pair of parallel supporting bars 33 and compressed between a flange 38 extending from the conduit 30 and a plate member 36. The cloth edges are trimmed to conform to the inner circumference of the filter base structure. The invention is not limited to the use of a plurality of plies of cloth to form the baffles. It is evident that I may choose from many other materials having the requisite density and flexibility. For example, I may use blocks of a plastic material made by DuPont and currently on the market under the name "Teflon" instead of the canvas shown in the drawings. This material has the rather unique quality of quickly wearing down to conform exactly to the interior dimensions of the filter drum and thereafter operating without further appreciable wear while effectively sealing off the discharge area. Another example of a material suitable for some purposes is strips of rubber or rubbery material laminated together.

The interval between the two baffles forms a narrow slot extending the length of the interior of the base structure permitting gas supplied through the conduits 26, 24$^a$ and 30 to act upon that portion of the inner surface of the revolving filter cloth which is opposite this slot at the time. The pipe 30 and the baffles 31 and 32 are positioned so that the slot between the baffles is slightly offset away from the direction of rotation of the filter base structure and not directly above the solids discharge valve. The reason for this offsetting is that I have found that the particles dislodged from the filter cloth tend to be carried along in the direction of rotation and, consequently, if the point of discharge were placed directly above the valve 37 at the bottom of the container 10, the discharged particles would tend to pile up on the inclined side wall of the container in the general area indicated by the numeral 39 in Fig. 2. I have found that by shifting the extension pipe 30 counter-clockwise as seen in Fig. 2, through a slight angle, which is related to the angular velocity of the filter structure, the discharged solids may be caused to flow directly into the discharge valve 37 without piling up on any bottom surface of the container 10. While no exact formula can be stated as to the number of degrees of counter-clockwise shift required, this adjustment may be readily made by a competent engineer who can determine the degree of adjustment which will yield the most efficient results for the particular materials to be separated at any given speed of rotation.

I have found that the solids collected may be discharged readily and with great efficiency from the filter cloth by applying to the narrow discharge area thereof which faces the slot between the baffles gas under slight pressure which is preferably pulsating rapidly. Excellent results may be obtained with a maximum pressure of each pulse of the order of only a few inches of water. The frequency of the pulses should be such that the cloth in the discharge area is vibrated or pulsated with great rapidity, of the order, for example, of 1,000 to 2,000 cycles. In general higher frequencies give better results, dependent upon density of the cloth, size of particles and other special factors which may be present. Such vibrations quickly loosen the collected solids which fall by gravity into the chamber toward the discharge valve 37. The mode of operation and amplitude and intensity of vibrations of the cloth may be compared to the action of a bass drum wherein the pressure is substantially atmospheric but vibrations from the head which is beaten by the drum stick are transmitted to the other head which vibrates with substantially equal intensity.

While the pulsating gas pressure may be provided by any suitable means, I prefer to use a special rotating valve in the gas supply line together with valve means for controlling the pressure to the desired value as hereinafter described.

The valve consists essentially of two conduit portions 41 and 43 arranged to fit as a section between the pipes 24 and 26 attachable thereto by flanges 50 and 52. The body portion 45 of the valve contains a cylindrical chamber 46. Portions of the opposite circumferential walls of the body portion 45 are cut away forming rectangular openings 47 and 48 therethrough and connecting the sections 41 and 43 to the chamber 46. The oppositely extending sections 41 and 43 lie in the same axis and at right angles to the axis of the cylindrical chamber 46. A relatively thin generally rectangular vane 42 is rotatably mounted within the cylindrical cavity 46, suitable bearings 49 and 51 being provided in the opposite end walls of the cavity for receiving the shaft on which the vane is mounted. An extension 60 of this shaft carries a pulley 62 which may be driven by the belt 35 from the motor 34.

The vane 42 is shaped to fit the chamber 46 with very close tolerances and its thickness is kept to a minimum. I have found that the valve 40 should be open and closed for substantially equal periods during operation and further that the closing and opening should be as abrupt as possible to produce the required abrupt pulsations in the stream of gas flowing therethrough.

Further the openings 47 and 48 are each arranged to extend for a circumferential distance substantially less than one-half of the interior circumference of the cavity 46 and preferably extending for about one-fourth of such interior circumference, thus dividing the interior of the cavity into four equal segments.

With the parts of the valve proportioned in this way, when the vane 42 is rotated the valve will open and close with abruptness, as contrasted to the gradual opening and closing of most valves, and it will remain open and closed for approximately equal intervals of time. The flow of air or other gas supplied under pressure to the intake of the valve by the blower 28 will therefore be interrupted at a frequency determined by the speed of rotation of the vane 42 and the stream of air coming from the outlet side of the valve will consist of a train of abrupt pulsations of approximately equal duration.

As already indicated, air or gas under pressure is supplied to the inlet side of the special valve 40 from the output side of the blower 28. For best results, as already stated, I have found that the pulsating gas supplied to discharge the solids should be of very low pressure, while higher pressure of the blower discharge causes violent pulsations. In order to reduce this pressure to the optimum very low value, I have provided a relief valve 65 in an extension of the pipe 24. A pressure gauge 67 is also provided in this line and by appropriately adjusting the valve 65, which vents the line 24, pulsating air at the desired pressure may be provided. The gauge 67 should preferably read very low pressures and should be damped to eliminate lashing of the indicator with pulsations of the gas. Furthermore, I have found that the pipes 24, 24ª and 30 should be of sufficiently large cross-section as not to damp to any appreciable extent the vibrations produced by the valve 40. For the same reason the valve 40 should be located as close to the apparatus as possible.

As previously mentioned, for removing the solids from the collecting chamber 11 I provide the special rotating discharge valve 37 in the generally trough-shaped bottom of the container 10. This valve may constitute a star valve which operates upon the principle of the familiar revolving door. Particles collect in the pockets between the vanes of the valve as they successively open into the chamber. Further rotation of the valve discharges these collected solids into the outlet 69, while preventing the escape of any appreciable volume of dust laden gaseous medium filling the chamber 11 or adversely affecting the pressure differential between the chamber and the interior of the filter.

Turning to the feature of the invention by which the effective filtering area may be enormously increased, reference will be had primarily to Figs. 2 and 5 and 6. The cloth supporting bars 19 and the slotted tubes 18 are mounted, as by welding, on the drum ring 73 to form a skeleton structure. To facilitate multiple construction, I make this drum ring in four sections, as seen in Fig. 2, the sections abutting each other, the joints being indicated by the numeral 78. To guard against any air leak through the joints 78, I cover and seal these joints by four cover plates 81, one of which is visible in Fig. 5. A free end of the cloth is first locked by a rod 18ª in one of the slotted tubes 18. The cloth is then led over an adjacent bar 19 and tucked into the slot in the next tube 18, where it is held by another rod 18ª, and so on, in alternation, until installation is complete. Finally, the other end of the cloth may be locked into the first slotted tube 18 overlying the opposite end, thus completing the mounting of the same. The cloth has thus assumed a generally zig-zag pattern and it is evident that the area available for filtration has been increased by a factor of at least two.

At this point in the cloth fitting operation, marginal portions of the filter cloth protrude at both ends of the base structure beyond the flanges 79 on the sectional drum rings 73. In order to secure these margins, I provide at each end a series of generally triangular locking plates 77 which may be attached by machine screws 75 to overlie the marginal portions of the cloth and to lock them securely against the segmented drum ring 73 and the flange 79.

The cover plates 81 are secured to the structure beneath them by a series of machine screws 75ᵇ. Similarly members 73 are locked to the supporting drum ring 16 by machine screws 75ª. I have built up the cloth locking means as a series of abutting cloth-supporting segments and locking plates as a matter of convenience, but it is evident that the cloth might also be held and the ends of the filter structure sealed against loss of the vacuum by other suitable means.

By the cloth locking means just described, both ends of the filter base structure are secured against the entrance of air from the chamber 11, thus holding the vacuum and forcing the gaseous vehicle to pass through the surface of the filter cloth.

In the operation of my improved dust collector the dust laden gas is admitted to the collecting chamber 11 through the inlet 12 with the blower 28 operating and the filter structure rotating driven by a suitable drive (not shown) through the sprocket 83. Likewise, the intermittent valve 40 is rotated, driven by the motor 34, and the star valve 37 is driven through the sprocket 85 by any suitable means. The blower 28 exhausts the air from within the generally cylindrical filter structure, causing air from the dust laden chamber to pass through the filter cloth leaving a deposit of solid particles on the surface of the cloth until the cloth reaches the discharge zone between the baffles 31 and 32. Withdrawal of the air causes fresh dust laden air to enter at 12. At the discharge area the cloth is isolated from the vacuum applied to the remainder of the interior of the filter structure and pulsating discharge gas under very slight pressure is applied through the pipes 26, 24, and 30 and through the slot between the baffles 31 and 32.

While no exact rule may be stated with respect to the pressures to be employed in the various components of the dust collector, it may be said generally that the pressure in the collecting chamber 11 should be low enough to draw dust laden air continuously through the inlet 12 from a dust filled room or any other source. The pressure within the filter structure should be sufficiently lower than the pressure in the chamber 11 to cause the air to flow through the filter cloth at fairly higher velocity, thereby permitting operation at a maximum capacity. The pressure in the conduit 26 before the intermittent valve 40 should be as high as the characteristics of the blower 28 will permit. However, the pressure on the exhaust side of the valve 40 as previously indicated, should be very low, only slightly higher than the pressure in the chamber 11. I have found, for example, that an average pressure in the conduit 24 of only a few inches of water and slightly in excess of the pressure in the chamber 11 will yield excellent results. This pressure is, of course, regulated by the relief valve 65 and the pressure may be read on the gauge 67. By way of example, but not limiting the scope of the invention, operating pressures may be of the order of the following:

Atmospheric pressure, 14.7 p. s. i. (absolute); pressure in chamber 11, 14.5 p. s. i.; pressure in filter structure, 14.3 p. s. i.; pressure in conduit 26 before the valve 40, 15.7 p. s. i., pressure in discharge conduit, 24ª and 30, 14.55 p. s. i.

The permissible and optimum speeds of rotation of the filter cloth likewise cannot be stated in any absolute terms. It is evident that the depth to which particles will collect on the surface of the cloth will depend to some extent upon the length of exposure to the dust while under suction. Slower rotative speeds would permit longer exposure of the cloth. On the other hand, the rate of flow of air through the cloth will become slower and slower with the increase in the deposit of solids. Consequently, the speed must be adjusted taking into account the nature, density and size of the particles, the type of filter cloth employed, etc., and adjustment in the light of such factors is well within the skill of the filtration engineer.

Similarly, exact figures cannot be given for the weight of solids which my novel filter may be expected to remove from a dust-laden atmosphere during any given time interval, since, here again, the particle density, particle size, speed of rotation and nature of the filter medium must all be taken into account. In general the volume of air which will pass through a given area of the filter cloth in a given time will furnish a measure of the improved efficiency and capacity of my filter. Volumes of the order of 100 to 200 ft.$^3$/min. per ft.$^2$ of filter cloth area should not be outside the range of my machine under ordinary operating conditions. Such capacities are in marked contrast to the much lower capacities of dust filters of the prior art.

I have found that a novel dust collector constructed in accordance with the invention will maintain a clean cloth to thereby obtain almost 100% efficiency of the cloth for capacity and clarity. It has the principal advantages of permitting continuous operation while at the same time employing a filter cloth which is continuously cleaned so that the gaseous medium may pass readily through the cloth without the building up of thicknesses of solids which, as in prior art devices, very substantially interfere with efficient operation.

While I have disclosed and described a preferred embodiment of the invention, it will nevertheless be understood that the same is capable of modifications and changes by those skilled in the art and nevertheless within the scope of the appended claims.

I claim:

1. A continuous rotary dust collector which comprises, in combination, a container providing a filtration chamber having an inlet for the gaseous mixture to be filtered, a generally cylindrical hollow gas permeable filter base structure mounted in said chamber for rotation about its principal axis, a filter cloth surrounding and carried by said structure, a source of suction, a conduit connecting said source to the interior of said structure, stationary baffles mounted within said structure extending into engagement with the inner surface thereof and defining a discharge sub-chamber isolated from said suction adjacent a narrow discharge area of said cloth, and a source of rapidly pulsating gas under very low pressure in communication with said sub-chamber for rapidly vibrating said cloth in said discharge area thereby to discharge therefrom into said filtration chamber any particles deposited on the outer surface thereof.

2. The combination as claimed in claim 1 in which said stationary baffles are so positioned as to locate said discharge area on the descending side of said rotatable structure near the bottom of said container and in which said container is provided with a valve in the bottom thereof for releasing the discharged particles.

3. The combination as claimed in claim 2 in which said base structure comprises a pair of axially spaced circular end plate members and a generally cylindrically arranged series of cloth supporting members joining said plate members and supporting said filter cloth.

4. The combination as claimed in claim 3 in which said cloth supporting members comprise an outer series of smooth rods and an inner series of outwardly slotted tubes and in which said filter cloth passes around each of the members of said outer series and is held in the slots of the members of said inner series.

5. A continuous filtering device for separating solid particles from a gaseous vehicle which comprises a container, said container having an inlet for the admission of the particle laden gas, a generally cylindrical hollow gas-permeable filter base structure mounted within said container for rotation about its principal axis, said base structure comprising a pair of end plate members including end rings and an inner and an outer series of longitudinally extending members affixed to said end rings, the members of the outer series comprising smooth rods and the members of said inner series comprising hollow tubes having outwardly directed longitudinally extending slots, a filter cloth surrounding said outer members and having narrow portions thereof tucked in said slots and marginal portions extending beyond both ends of said base structure, locking rods overlying said narrow portions for holding the same in said slots, plate members attachable to said end rings for locking said marginal portions of filter cloth thereto, a conduit for connecting the major portion of the interior of said base structure to a source of suction for creating a partial vacuum therewithin for drawing said gas through said cloth leaving a deposit of said solids on the outer surface thereof, a pair of stationary longitudinally extending spaced baffles mounted within said base structure and engaging the inner surface of said tubes for isolating from said vacuum a narrow discharge area of said cloth near the bottom of said container, a conduit for supplying pulsating gas under slight pressure to said discharge area between said baffles for vibrating the portion of said cloth which is opposite the interval between said baffles for continuously discharging into and toward the bottom of said container said solids deposited thereon and a valve arranged in the bottom of said container for releasing therefrom the solids so discharged.

6. In a filter, a filter drum comprising a pair of end plate members having inner portions thereof turned outwardly to form trunnions, the remaining portions thereof extending radially outwardly forming end rings for the drum, longitudinally extending filter cloth supporting members and supports therefor mounted as a generally cylindrical series between the radially outwardly extending portions of said rings, and a filter cloth surrounding said cloth supporting members, some of said cloth supporting members constituting slotted tubes having narrow portions of said cloth tucked into the slots thereof and locking rods inserted in said slots overlying and retaining said portions of said cloth, the others of said cloth supporting members constituting smooth rods.

7. In a filter, a filter drum comprising a pair of end plate members having inner portions thereof turned axially outwardly to form trunnions, the remaining portions thereof extending radially outwardly forming end rings for the drum, longitudinally extending filter cloth supporting members and supports therefor mounted as a generally cylindrical series between the radially outwardly extending portions of said rings, a filter cloth surrounding said cloth supporting members, some of said cloth supporting members constituting slotted tubes having narrow portions of said cloth tucked into the slots thereof and locking rods inserted in said slots overlying and retaining said portions of said cloth, the others of said cloth supporting members constituting smooth rods, marginal portions of said cloth extending beyond said supports and being bent around the edges thereof, and locking members overlying and locking said marginal portions to said supports.

8. In a filter, a filter drum construction comprising a pair of parallel spaced drum heads with axial apertures for the entrance of fluid conduits to the interior of the drum, each drum head comprising a base ring having a central portion thereof turned axially outwardly to form a trunnion, a sectionalized outer ring assembly attached to said base ring and extending radially outwardly therefrom, inner and outer filter cloth supporting members affixed in alternation to said ring assembly to form a generally cylindrical series, the inner members comprising hollow tubes having outwardly directed longitudinally extending slots and the outer members comprising smooth rods, a filter cloth surrounding said members and having narrow portions thereof tucked in said slots of said inner members and marginal portions extending beyond both ends of said drum head, locking rods overlying said narrow portions for holding the same in said slots and locking plates attachable to said outer ring assembly overlying and locking said marginal portions of said cloth thereto.

References Cited in the file of this patent

UNITED STATES PATENTS

| | | |
|---|---|---|
| 272,474 | Prinz | Feb. 20, 1883 |
| 1,288,614 | Kern | Dec. 24, 1918 |
| 2,178,481 | Linderoth | Oct. 31, 1939 |
| 2,364,877 | Smellie | Dec. 12, 1944 |

FOREIGN PATENTS

| | | |
|---|---|---|
| 148,799 | Great Britain | Oct. 10, 1921 |
| 282,849 | Great Britain | Dec. 28, 1927 |
| 488,717 | Germany | Jan. 8, 1930 |
| 781,022 | France | Feb. 18, 1935 |